United States Patent
Tsuda (10) Patent No.: US 10,706,337 B2
(45) Date of Patent: Jul. 7, 2020

(54) CHARACTER RECOGNITION DEVICE, CHARACTER RECOGNITION METHOD, AND RECORDING MEDIUM

(71) Applicant: KYOCERA Document Solutions Inc., Osaka-shi, Osaka (JP)

(72) Inventor: Mineyuki Tsuda, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 228 days.

(21) Appl. No.: 15/901,951

(22) Filed: Feb. 22, 2018

(65) Prior Publication Data

US 2018/0247166 A1    Aug. 30, 2018

(30) Foreign Application Priority Data

Feb. 27, 2017    (JP) .................................. 2017-034606

(51) Int. Cl.
   *G06K 9/68*     (2006.01)
   *G06K 9/46*     (2006.01)
   *G06K 9/34*     (2006.01)

(52) U.S. Cl.
   CPC .......... *G06K 9/6828* (2013.01); *G06K 9/344* (2013.01); *G06K 9/4633* (2013.01); *G06K 2209/01* (2013.01)

(58) Field of Classification Search
   CPC .. G06K 9/344; G06K 9/6828; G06K 2209/01; G06F 17/214; G06F 17/218
   USPC ........................................................ 382/202
   See application file for complete search history.

(56) References Cited

U.S. PATENT DOCUMENTS

| | | | | |
|---|---|---|---|---|
| 6,496,600 B1 * | 12/2002 | Huang | ................. | G06K 9/6828 |
| | | | | 382/187 |
| 7,095,894 B2 * | 8/2006 | Van Hall | .............. | G06K 9/6828 |
| | | | | 382/224 |
| 2002/0181779 A1 * | 12/2002 | Hansen | ................ | G06K 9/6828 |
| | | | | 382/209 |

FOREIGN PATENT DOCUMENTS

| | | | |
|---|---|---|---|
| JP | S58-80781 A | | 5/1983 |
| JP | H03-71380 A | | 3/1991 |

OTHER PUBLICATIONS

Zhaohai, et al. (Computer English Translation of Chinese Patent No. CN10337371 (A), pp. 1-32. (Year: 2013).*

* cited by examiner

*Primary Examiner* — Daniel G Mariam
(74) *Attorney, Agent, or Firm* — Viering, Jentschura & Partner MBB (57) ABSTRACT

An multifunction peripheral includes a font dictionary data configured to include an italic font and a non-italic font for each character code, a determination method selection unit that selects, from a plurality of italic determination methods that are used for italic determination for the character, the italic determination method that is associated with the character code that has been acquired, an italic determination unit that determines whether or not the character in the image data is italic using the italic determination method that has been selected by the determination method selection unit, and a font specifying unit that specifies a font of the character by checking the character that has been determined to be italic by the italic determination unit only with the italic font and checking the character that has been determined to be non-italic only with the non-italic font.

11 Claims, 6 Drawing Sheets

| DETERMINATION METHOD \ CHARACTER CODE | 0 | 1 | 2 | 3 | 4 | 5 | 6 | 7 | 8 | 9 | A | B | C | D |
|---|---|---|---|---|---|---|---|---|---|---|---|---|---|---|
| (1) STRAIGHT-LINE DETECTION BY HOUGH CONVERSION | | ○ | | | ○ | | | | | | | ○ | | ○ |
| (2) GRAVITY CENTER COMPARISON | ○ | | ○ | ○ | | | | ○ | ○ | | ○ | | ○ | |
| (3) STRAIGHT-LINE DETECTION BY LEAST-SQUARE METHOD | | | | | | ○ | ○ | | | ○ | | | | |

|  | E | F | G | H | I | J | K | L | M | N | O | P | Q | R | S | T | U | V |
|---|---|---|---|---|---|---|---|---|---|---|---|---|---|---|---|---|---|---|
| (1) | ○ | ○ | | ○ | ○ | ○ | ○ | ○ | ○ | ○ | | ○ | | ○ | | ○ | | |
| (2) | | | ○ | | | | | | | | ○ | | | | ○ | | ○ | ○ |
| (3) | | | | | | | | | | | | | ○ | | | | | |

|  | W | X | Y | Z | a | b | c | d | e | f | g | h | i | j | k | l | m | n |
|---|---|---|---|---|---|---|---|---|---|---|---|---|---|---|---|---|---|---|
| (1) | | ○ | | | ○ | | ○ | | ○ | | ○ | ○ | ○ | ○ | ○ | ○ | ○ | ○ |
| (2) | ○ | ○ | | ○ | ○ | | ○ | | ○ | | | | | | | | | |
| (3) | | | | | | | | | | | | | | | | | | |

|  | o | p | q | r | s | t | u | v | w | x | y | z |
|---|---|---|---|---|---|---|---|---|---|---|---|---|
| (1) | | ○ | ○ | ○ | | ○ | ○ | | | | | |
| (2) | ○ | | | | ○ | | | ○ | ○ | ○ | ○ | ○ |
| (3) | | | | | | | | | | | | |

CHARACTER RECOGNITION DEVICE, CHARACTER RECOGNITION METHOD, AND RECORDING MEDIUM

CROSS REFERENCE TO RELATED APPLICATION

The disclosure of Japanese Patent Application No. 2017-34606 filed on Feb. 27, 2017, including the specification, drawings and abstract is incorporated herein by reference in its entirety.

BACKGROUND

The present disclosure relates to a character recognition device that recognizes a character in an image by optical character recognition and acquires a character code, a character recognition method, and a recording medium.

In recent years, conversion of image data to electronic data in which retrieval or editing of a character is possible is performed by performing character recognition by optical character recognition (OCR) on image data that has been generated by scanning an original document or the like. In the conversion, in order to create electronic data in the same format as that of the original document, a font (a type face) of a character that is used in the original document has to be specified. The font is non-italic or italic, and there is a case in which the shape of a non-italic character similar to the shape of an italic character in some other font. Therefore, a technique of determining whether or not a font of a character in image data is italic has been proposed.

In a known technology, based on a plurality of conditions, such as a distribution state or the position of the center of gravity of an outline pixel of a character in image data, whether or not an adjacent character is italic, or the like, it is determined whether or not the character is italic. Also, in the known technology, a marginal distribution (a histogram) of a character string in the image data is created, it is determined, if the matinal distribution in which a space between characters is clear is in a perpendicular direction to the character string, that the character is non-italic, and it is determined, if the matinal distribution is in an oblique direction relative to the character string, that the character is italic.

SUMMARY

A character recognition device according to the present disclosure is a character recognition device that recognizes a character in image data by optical character recognition and acquires a character code, and includes a font dictionary data configured to include an italic font and a non-italic font for each character code, a determination method selection unit that selects, from a plurality of italic determination methods that are used for italic determination for the character, the italic determination method that is associated with the character code that has been acquired by the optical character recognition, an italic determination unit that determines whether or not the character in the image data is italic using the italic determination method that has been selected by the determination method selection unit, and a font specifying unit that specifies a font of the character by checking the character that has been determined to be italic by the italic determination unit only with the italic font included in the font dictionary data and checking the character that has been determined to be non-italic only with the non-italic font included in the font dictionary data.

The plurality of italic determination methods may be straight-line detection by Hough conversion, gravity center comparison, and straight-line detection by a least-square method.

The italic determination unit may be configured to perform straight-line detection for the character by the Hough conversion, determine, if a straight line in a longitudinal direction of the character has been detected, that the character is non-italic, and determine, if a straight line in a direction other than the longitudinal direction of the character has been detected, that the character is italic.

The italic determination unit may be configured to calculate each of an upper end part side gravity center position and a lower end part side gravity center position of the character, determine, if a distance between the upper end part side gravity center position and the lower end part side gravity center position relative to a lateral direction of the character is in a specific distance range, that the character is non-italic, and determine, if the distance is outside the specific distance range, that the character is italic.

The italic determination unit may be configured to detect a straight line with which a distance in the longitudinal direction of the character is shortest by the least-square method, determine, if a straight line in the lateral direction of the character has been detected, that the character is non-italic, and determine, if a straight line in a direction other than the lateral direction of the character has been detected, that the character is italic.

Each of character codes that indicate 1, 4, B, D to F, H to N, P, R, T, Y, b, d, f, h to n, p to r, t, and u may be associated with the straight-line detection by the Hough conversion.

Each of character codes that indicate 0, 2, 3, 7, 8, A, C, G, O, S, U to X, Z, a, c, e, g, o, s, and v to z may be associated with the gravity center comparison.

Each of character codes that indicate 5, 6, 9, and Q may be associated with the straight-line detection by the least-square method.

The determination method selection unit may be configured to select multiple ones of the italic determination methods for a specific one of the character codes, the italic determination unit may be configured to determine whether or not the character in the image data is italic using each of the multiple ones of the italic determination methods which have been selected by the determination method selection unit, and the font specific unit may be configured to specify a font of the character by exceptionally checking, if results of determinations performed by the italic determination unit using the multiple ones of the italic determination methods are not the same, the character with the font dictionary data including the italic font and the non-italic font.

The determination method selection unit may be configured to select multiple ones of the italic determination methods only if the font that has been specified by the font specifying unit is a font of a specific type.

A character recognition method according to the present disclosure is a character recognition method of a character recognition device that recognizes a character in image data by optical character recognition and acquires a character code. The character recognition device includes a font dictionary data configured to include an italic font and a non-italic font for each character code. The character recognition method includes a determination method selection step of selecting, from a plurality of italic determination methods that are used for italic determination for the character, the italic determination method that is associated with the character code that has been acquired by the optical character recognition, an italic determination step of determining whether or not the character in the image data is italic using the italic determination method that has been selected by the determination method selection step, and a font specifying step of specifying a font of the character by checking the character that has been determined to be italic by the italic determination step only with the italic font included in the font dictionary data and checking the character that has been determined to be non-italic by the italic determination step only with the non-italic font included in the font dictionary data.

A recording medium according to the present disclosure is a non-transitory computer-readable recording medium which is able to record a program that is executable by a computer. The program causes the computer to realize a determination method selection function of selecting, from a plurality of italic determination methods that are used for italic determination for the character, the italic determination method that is associated with the character code that has been acquired by the optical character recognition, an italic determination function of determining whether or not the character in the image data is italic using the italic determination method that has been selected by the determination method selection function, and a font specifying function of specifying a font of the character by checking the character that has been determined to be italic by the italic determination function only with an italic font included in font dictionary data that is configured to include the italic font and a non-italic font and checking the character that has been determined to be non-italic by the italic determination function only with the non-italic font included in the font dictionary data.

DETAILED DESCRIPTION

An embodiment of the present disclosure will be described in detail below with reference to the accompanying drawings. Note that, in the embodiment below, elements that exhibit similar functions are denoted by the same reference character.

Figure 1:
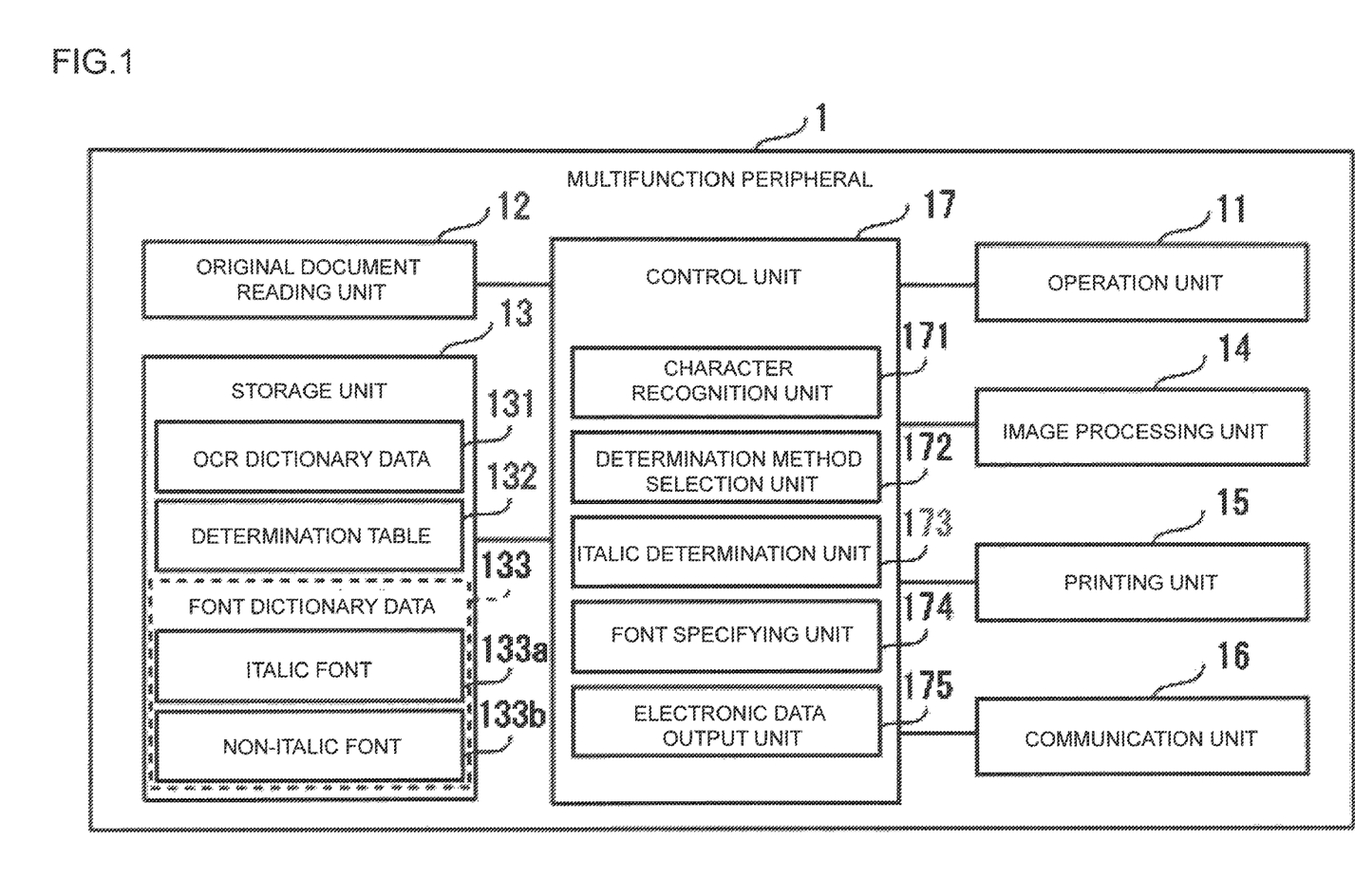
FIG. 1 is a function block diagram illustrating a schematic configuration of a multifunction peripheral according to an embodiment.

In the embodiment below, as a character recognition device, as illustrated in FIG. 1, a multifunction peripheral 1, such as a copying machine, an image forming device, or the like, will be described as an example. The multifunction peripheral 1 includes an operation unit 11, an original document reading unit 12, a storage unit 13, an image processing unit 14, a printing unit 15, a communication unit 16, and a control unit 17.

The operation unit 11 is a user interface including various types of operation keys, such as a touch panel, a numeric keypad, a reset key, a stop key, a start key, or the like.

The original document reading unit 12 is a scanner that irradiates an original document that has been fed by an original document feeding device (not illustrated) or an original document that is placed on a platen glass with light and receives reflected light thereof or the like to read an original image.

The storage unit 13 is a storage device, such as a semiconductor memory, a hard disk drive (HDD), or the like, and image data that has been read by the original document reading unit 12 and image data that has been received by the communication unit 16 are stored in the storage unit 13. Also, in the storage unit 13, OCR dictionary data 131, a determination table 132, and font dictionary data 133 are stored.

The image processing unit 14 is a unit that performs predetermined image processing on image data and, for example, performs image improving processing, such as zooming processing, concentration adjustment, gradation adjustment, or the like.

The printing unit 15 prints an image, based on image data that has been read by the original document reading unit 12, image data that is stored in the storage unit 13, and image data that has been received by the communication unit 16.

The communication unit 16 has a function of transmitting and receiving various types of data to and from an external terminal, such as a smart phone, a personal computer, or the like, via a network, such as a local area network (LAN), the Internet, or the like.

FIG. 17 is an information processing unit, such as a microcomputer or the like, which includes a central processing unit (CPU), a read only memory (ROM), a random access memory (RAM), or the like. A control program that is used for performing operation control of the multifunction peripheral 1 is stored in the ROM. The CPU of the control unit 17 performs control of the entire device in accordance with predetermined instruction information that has been input from the operation unit 11 by causing the control program that is stored in ROM to be read, expanded in the RAM, and thus executed. Also, the control unit 17 functions as a character recognition unit 171, a determination method selection unit 172, an italic determination unit 173, a font specifying unit 174, and an electronic data output unit 175. Note that the control program (a character recognition program) that is executable by the control unit 17 may be recorded in a computer-readable recording medium.

The character recognition unit 171 has a function of performing, based on the OCR dictionary data 131, optical character recognition on image data that is a target of character recognition, recognizing a character in the image data, and acquiring a character code. Thus, the character code that indicates the character in a state in which a font is not specified from the image data. The OCR dictionary data 131 is configured to include identification pattern data for optical character recognition or the like.

The determination method selection unit 172 has a function of selecting, from a plurality of italic determination methods used for italic determination for a character in image data, an italic determination method associated with the character code that has been acquired from the character recognition unit 171. Specifically, the determination method selection unit 172 selects an italic determination method, based on the determination table 132 illustrated in FIG. 2.

There are three italic determination methods, that is, (1) "straight-line detection by Hough conversion", (2) "gravity center comparison", and (3) straight-line detection by a least-square method, which are registered in the determination table 132. In the determination table 132, a character code that indicates a one-byte character of 0 to 9, A to Z, or a to z is associated with the corresponding one of (1) "straight-line detection by Hough conversion", (2) "gravity center comparison", and (3) "straight-line detection by a least-square method". Note that, in the determination table 132 illustrated in FIG. 2, a character that corresponds to each character code is indicated to make it easily understood.

For example, "1", "4", "B", "D" to "F", "H" to "N", "P", "R", "T", "Y", "b", "d", "f", "h" to "n", "p" to "r", "t", and "u" are associated with (1) "straight-line detection by Hough conversion". "0", "2", "3", "7", "8", "A", "C", "G", "O", "S", "U" to "X", "Z", "a", "c", "e", "g", "o", "s", and "v" to "z" are associated with (2) "gravity center comparison". "5", "6", "9", and "Q" are associated with (3) straight-line detection by a least-square method. In the experiments that have been conducted by the applicant, italic determination for a character in image data was performed with high accuracy using allocation of the determination table 132 illustrated in FIG. 2.

The italic determination unit 173 has a function of determining whether or not a character in image data is italic using the italic determination method that has been selected by the determination method selection unit 172. Specifically, the italic determination unit 173 cuts out a character image area 20 (see FIG. 3A and FIG. 3B) which has a rectangular shape and includes a single character from the image data, and determines whether or not a character in the character image area 20 that has been cut out is italic. After performing the above-described determination, the italic determination unit 173 gives each character in the image data italic information indicating that the character is italic or non-italic.

Figure 3A:
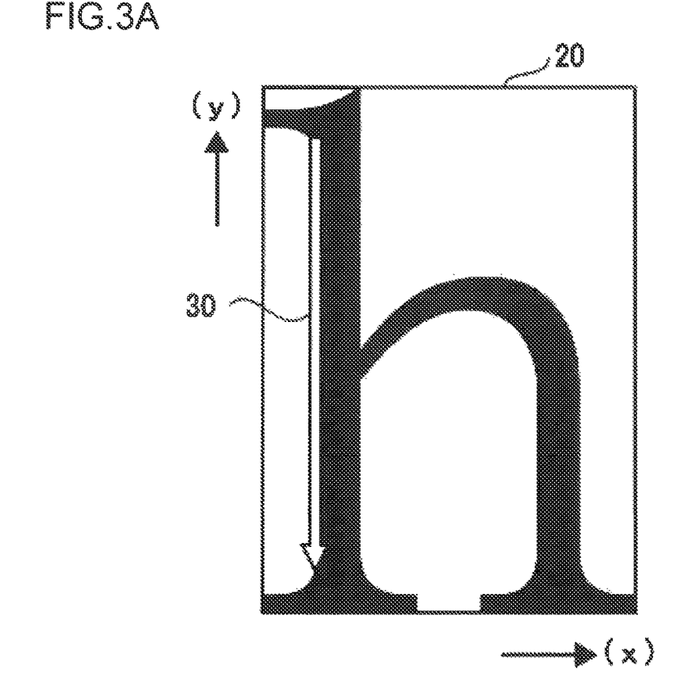
FIG. 3A is an image diagram of italic determination using a straight-line detection by Hough conversion.
Figure 3B:
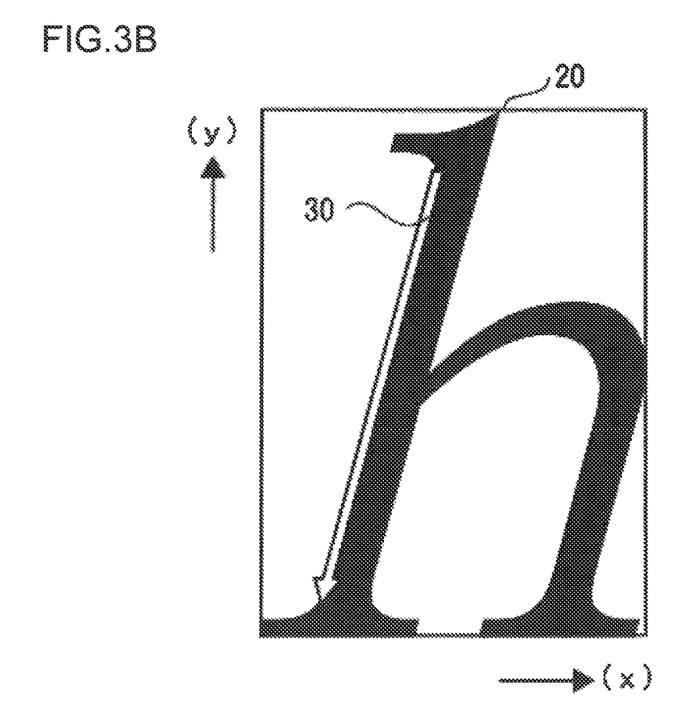
FIG. 3B is an image diagram of italic determination using straight-line detection by Hough conversion.

In an italic determination method using (1) "straight-line detection by Hough conversion", the italic determination unit 173 preforms straight-line detection for a character in the character image area 20 by Hough conversion that is a known straight-line detection algorithm. In straight-line detection by Hough conversion, a straight line 30 (a straight line representing a character pixel distribution) which passes a largest number of feature points is detected from many virtual lines that pass feature points (pixels that form a character) in the character image area 20. In the determination table 132, each of "1", "4", "B", "D" to "F", "H" to "N", "P", "R", "T", "Y", "b", "d", "h" to "n", "p" to "r", "t", and "u" each of which is a character indicating the corresponding character code associated with "straight-line detection by Hough conversion" includes, as a component element of the character, a straight line that extends in a longitudinal direction of the character. As illustrated in FIG. 3A, if the straight line 30 that extends in a y-axis direction of the character image area 20, that is, the longitudinal direction of the character, has been detected, the italic determination unit 173 determines that the character is non-italic. On the other, as illustrated in FIG. 3B, if the straight line 30 that extends in a direction other than the y-axis direction of the character image area 20, that is, the longitudinal direction of the character, has been detected, the italic determination unit 173 determines that the character is italic.

Figure 4A:
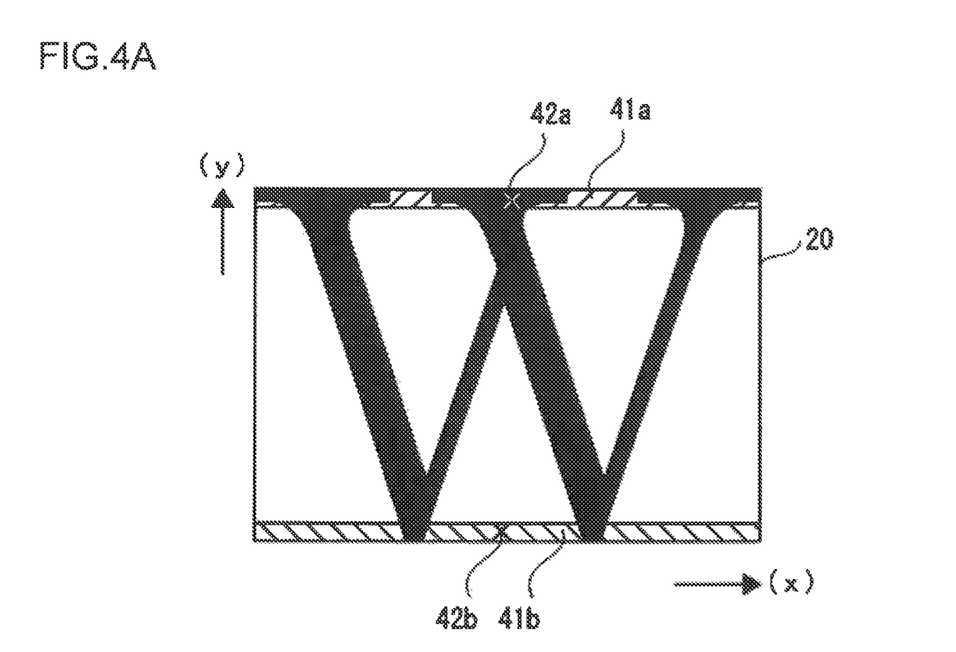
FIG. 4A is an image diagram of italic determination using gravity center comparison.

In an italic determination method using (2) "gravity center comparison", the italic determination unit 173 calculates, for the character image area 20, each of an upper end part side gravity center position 42a (a center position of a character pixel set in an upper end part side area 41a) based on feature points of the upper end part side area 41a and a lower end part side gravity center position 42b (a center position of a character pixel set in a lower end part side area 41b) based on feature points of the lower end part side area 41b. The upper end part side area 41a is an area including upper end parts of a character in the character image area 20 in a specific range in an x-axis direction, and the lower end side area 41b is an area including lower end parts of the character in the character image area 20 in a specific range in the x-axis direction.

Figure 4B:
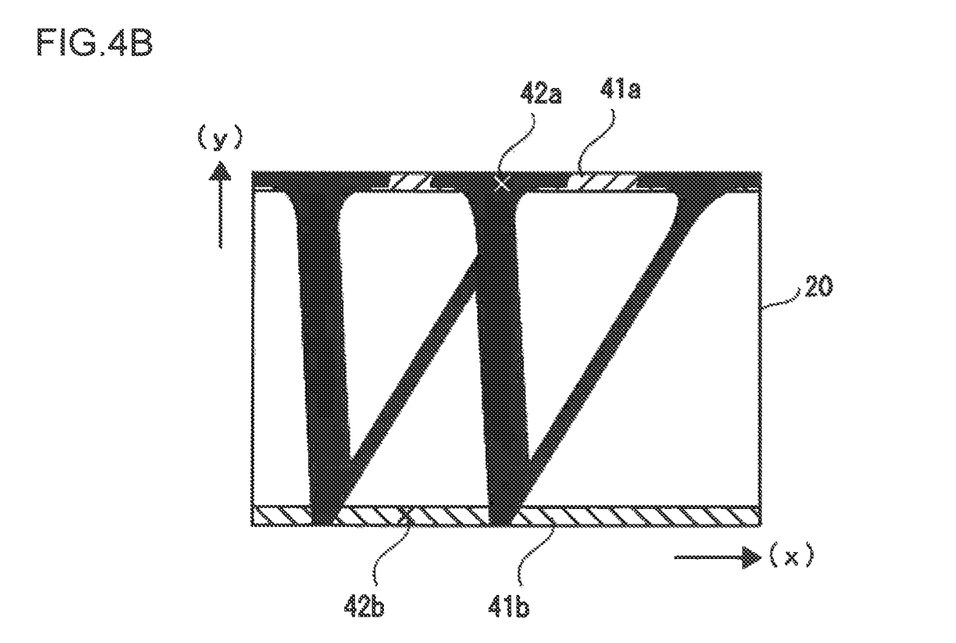
FIG. 4B is an image diagram of italic determination using gravity center comparison.

If a distance between the upper end part side gravity center position 42a and the lower end part side gravity center position 42b relative to the x-axis direction of the character image area 20 (the lateral direction of the character) is in a specific distance range, the italic determination unit 173 determines that the character is non-italic. On the other hand, as illustrated in FIG. 4B, if the distance between the upper end part side gravity center position 42a and the lower end part side gravity center position 42b relative to the x-axis direction of the character image area 20 (the lateral direction of the character) is outside the specific distance range, the italic determination unit 173 determines that the character is italic. In other words, if respective x coordinates of the upper end part side gravity center position 42a and the lower end part side gravity center position 42b are substantially the same, it is determined that the character is non-italic and, if the respective x coordinates of the upper end part side gravity center position 42a and the lower end part side gravity center position 42b are not substantially the same, it is determined that the character is italic.

Figure 5A:
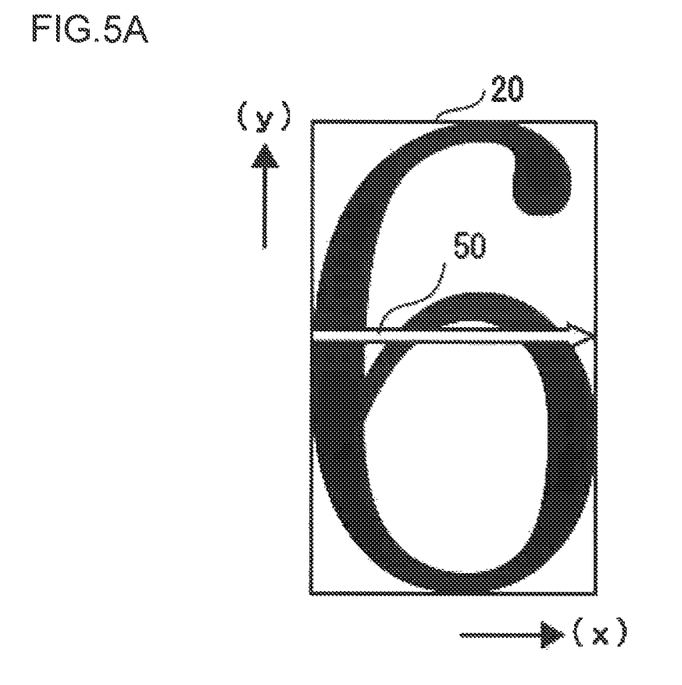
FIG. 5A is an image diagram of italic determination using straight-line detection by a least-square method.
Figure 5B:
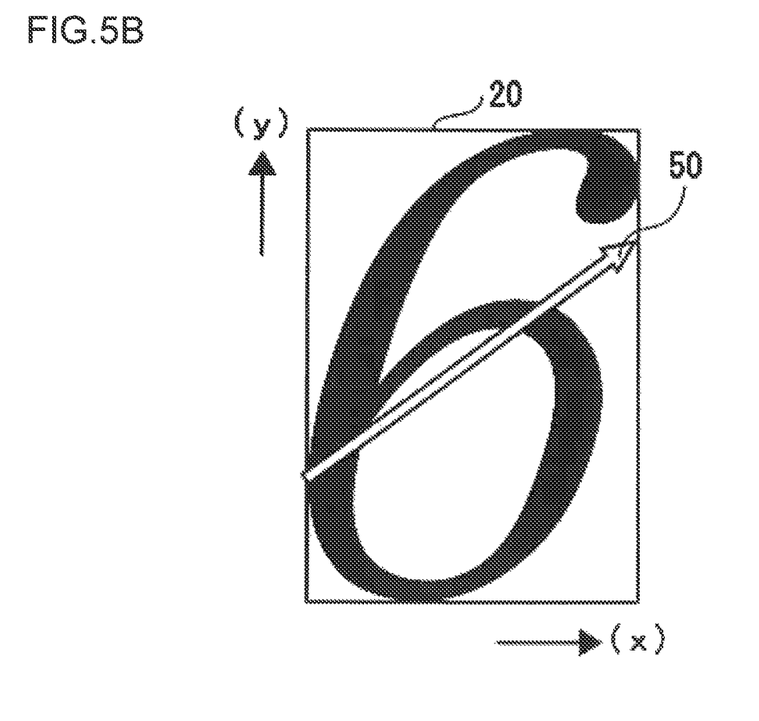
FIG. 5B is an image diagram of italic determination using straight-line detection by a least-square method.

In an italic determination method using (3) straight-line detection by a least-square method, the italic determination unit 173 performs straight-line detection from a pixel set of the character image area 20 using a least-square method that is a known straight-line detection algorithm. For example, as illustrated in FIG. 5A and FIG. 5B, the italic determination unit 173 detects a straight line 50 with which a distance in a y-axis direction (a longitudinal direction of a character) is shortest relative to the pixel set of the character image area 20 by a least-square method. As illustrated in FIG. 5A, if the straight line 50 in an x-axis direction (a lateral direction of the character) of the character image area 20 has been detected, the italic determination unit 173 determines that the character is non-italic. On the other hand, as illustrated in FIG. 5B, if the straight line 50 in a direction other than the x-axis direction of the character image area 20 (a direction other than the lateral direction of the character) has been detected, the italic determination unit 173 determines that the character is italic.

The font specifying unit 174 checks the character that has been determined to be italic by the italic determination unit 173 only with an italic font 133a included in the font dictionary data 133 and checks the character that has been determined to be non-italic by the italic determination unit 173 only with a non-italic font 133b included in the font dictionary data 133, thereby specifying a font of the character.

The electronic data output unit 175 has a function of replacing a character in image data with a font that has been specified by the font specifying unit 174, creating electronic data in which the character may be edited, for example, by a specific document creating software of the Word format or the like, and outputting the electronic data.

Figure 6:
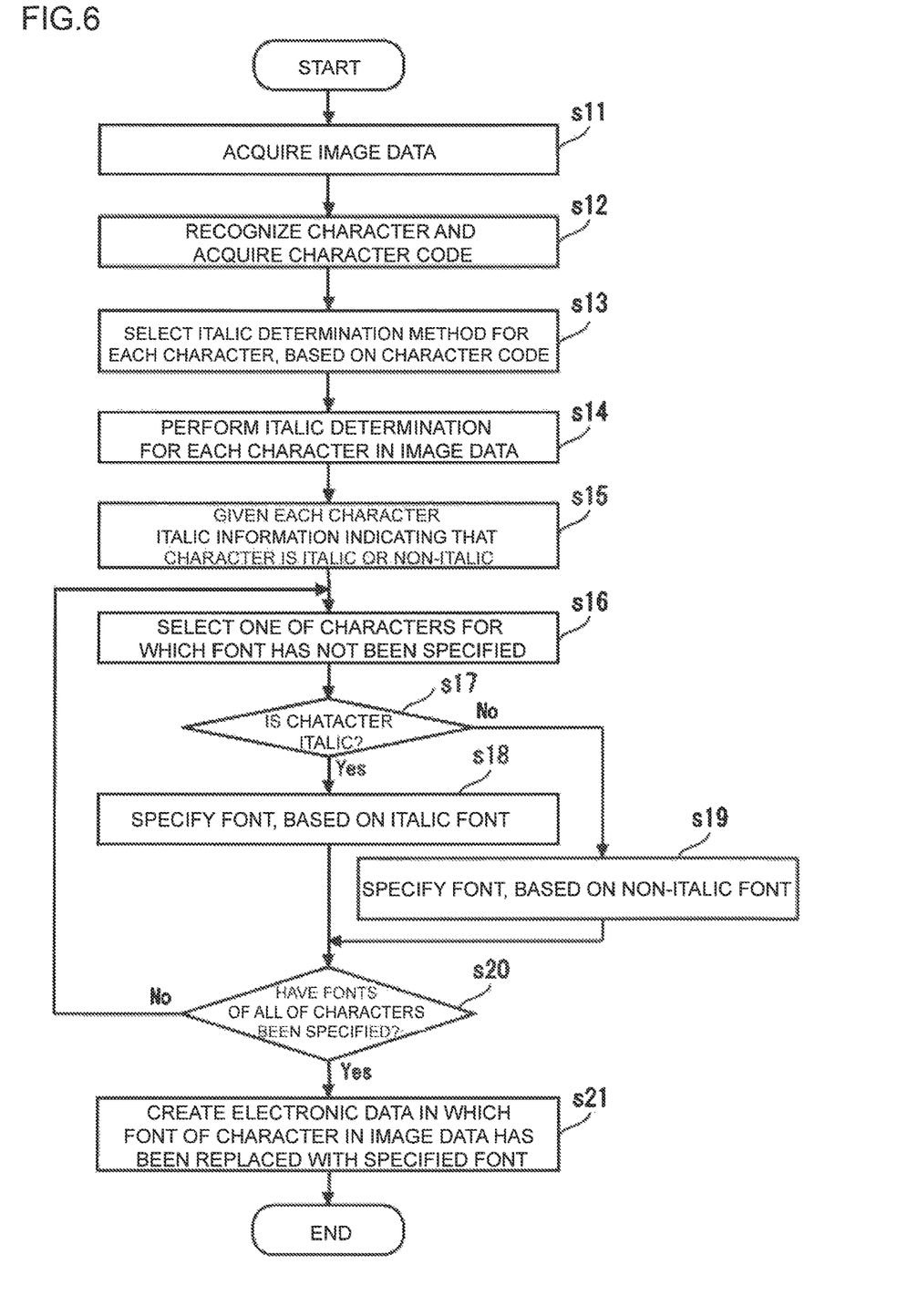
FIG. 6 is a flowchart illustrating a flow of character recognition processing of the multifunction peripheral illustrated in FIG. 1.

Next, with reference to FIG. 6, a flow of character recognition processing of the multifunction peripheral 1 will be described.

When the original document reading unit 12 scans an original document that is a target of character recognition and acquires image data of the original document (Step S11), the character recognition unit 171 performs optical character recognition on the image data, based on the OCR dictionary data 131, to recognize a character in the image data and acquire a character code (Step S12). Note that the character recognition unit 171 may be configured to perform optical character recognition on not only the image data that has been acquired by the original document reading unit 12 but also image data that is received from an external terminal via the communication unit 16 or image data that is stored in the storage unit 13.

Subsequently, the determination method selection unit 172 refers to the determination table 132 and selects, from a plurality of italic determination methods that are used for italic determination for a character, an italic determination method associated with the character code that has been acquired by the character recognition unit 171 (Step S13). Thus, for each character code, one of (1) "straight-line detection by Hough conversion", (2) "gravity center comparison", and (3) straight-line detection by a least-square method is selected. Subsequently, the italic determination unit 173 performs italic determination for each character in the image data using the italic determination method that has been selected by the determination method selection unit 172 (Step S14) and gives each character in the image data italic information indicating the character is italic or non-italic (Step S15).

Subsequently, the font specifying unit 174 selects one of characters that have not been specified in order from the first one of the characters in the image data (Step S16) and determines whether or not the character is italic or not, based on the italic information (Step S17).

If the character is italic (YES in Step S17), the font specifying unit 174 checks the character only with the italic font 133a included in the font dictionary data 133 and thereby specifies a font (Step S18). On the other hand, if the character is not italic (NO in Step S17), the font specifying unit 174 checks the character only with the non-italic font 133b included in the font dictionary data 133 and thereby specifies a font (Step S19). As described above, to the character that is a target for which a font is to be specified by the font specifying unit 174, italic information indicating that the character is italic or non-italic has been given in advance (italic determination has been performed). Therefore, the font specifying unit 174 performs pattern matching for the character in image data only with the non-italic font 133b or the italic font 133a, and thus, a time which it takes to perform matching may be reduced.

Subsequently, the font specifying unit 174 determines whether or not fonts of all of characters in the image data have been specified (Step S20) and, if the fonts of all of characters in the image data have not been specified (NO Step S20), the process returns to Step S16 in which a character for which a font has not been specified is selected.

If the fonts of all of characters in the image data have been specified (YES Step S20), the electronic data output unit 175 creates electronic data in which each of the fonts of the characters in the image data is replaced with the font that has been specified by the font specifying unit 174 (Step S21) and this processing ends. Note that the electronic data output unit 175 may be configured to replace the font of each character in image data with a font that has been specified by the font specifying unit 174 for each character, and also, may be configured to replace the font of each character in image data with a font that has been specified most frequently by the font specifying unit 174 in the image data.

As has been described above, the multifunction peripheral 1 of this embodiment is a character recognition device that recognizes a character in image data by optical character recognition and acquires a character code, and includes the font dictionary data 133 configured to include the italic font 133a and the non-italic font 133b of each character code, the determination method selection unit 172 that selects, from a plurality of italic determination methods that are used for italic determination for a character, an italic determination method associated with a character code that has been acquired by optical character recognition, the italic determination unit 173 that determines whether or not the character in the image data is italic using the italic determination method that has been selected by the determination method selection unit 172, and the font specifying unit 174 that specifies a font of the character by checking the character that has been determined to be italic by the italic determination unit 173 only with the italic font 133a included in the font dictionary data 133 and checking the character that has been determined to be non-italic by the italic determination unit 173 only with the non-italic font 133b included in the font dictionary data 133. Thus, the multifunction peripheral 1 is able to determine whether or not the character in the image data is italic using the italic determination method that is associated with the character code that has been character-recognized in advance and perform matching processing of the character in the image data with font data, based on a result of the determination. Therefore, the multifunction peripheral 1 is able to specify a font of the character in the image data with high accuracy by simple processing, based on whether or not the character is italic.

Figure 2:
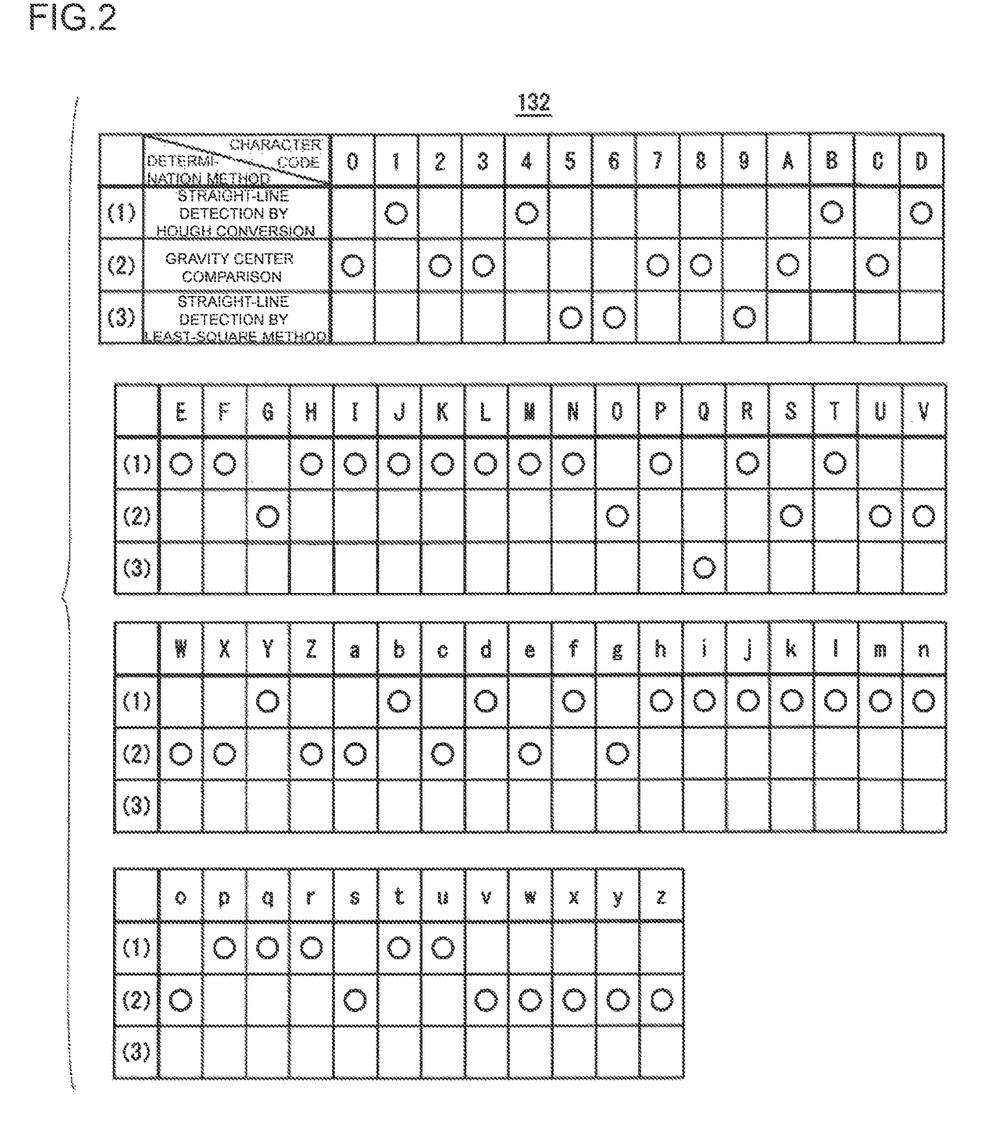
FIG. 2 is a chart illustrating an example of registration of a determination table illustrated in FIG. 1.

Note that, depending on the type of a font, there is a character code for which wrong determination tends to occur in italic determination. To cope with this, for a character code for which wrong determination tends to be occur in italic determination, an auxiliary determination table in which a different italic determination method from the corresponding italic determination method in the determination table 132 illustrated in FIG. 2 is associated may be stored in the storage unit 13. For example, for a character code that indicates "g", in the determination table 132, (2) "gravity center comparison" is associated but, in the auxiliary determination table, (3) "straight-line detection by a least-square method" may be associated.

In this case, the determination method selection unit 172 may be configured to select, for a character code that has been acquired by the character recognition unit 171, if different italic determination methods are associated in the determination table 132 and the auxiliary determination table, each of the italic determination method registered in the determination table 132 and the italic determination method registered in the auxiliary determination method. The italic determination unit 173 may be configured to perform, if a plurality of italic determination methods has been selected by the determination method selection unit 172, italic determination for a character in image data using each of the plurality of italic determination methods to check whether or not determination results are the same. The font specifying unit 174 may be configured to exceptionally check, if the determination results are not the same, the character with the font dictionary data 133 including the italic font 133a and the non-italic font 133b and thereby specify a font of the character. On the other hand, the font specifying unit 174 may be configured to check, if the determination results are the same, the character with one of the italic font 133a and the non-italic font 133b, based on the determination results, and specify a font.

Note that the determination method selection unit 172 may be configured to refer to, only if the font that has been specified by the font specifying unit 174 is a font of a specific type, for which wrong determination tends to occur in italic determination, the auxiliary determination table and select, as an italic determination method that is associated with the character code, a different italic determination method from the italic determination method that has been selected from the determination table 132. That is, if the specified font is a font of a specific type, for which wrong determination tends to occur in italic determination, a second italic determination method may be selected. In this case, the italic determination unit 173 may be configured to determine whether or not the character in the image data is italic again using the italic determination method that has been selected from the auxiliary determination table. Also, the font specifying unit 174 may be configured to specify, if the determination result by the italic determination unit 173 is different from the determination result that has been achieved using the italic determination method registered in the determination table 132, a font of the character again, based on the determination result by the italic determination unit 173.

Note that a character recognition method according to the present disclosure is a character recognition method of a character recognition device that recognizes a character in image data by optical character recognition and acquire a character code. The character recognition device includes a font dictionary data configured to include an italic font and a non-italic font for each character code. The character recognition method includes a determination method selection step of selecting, from a plurality of italic determination methods that are used for italic determination for the character, the italic determination method that is associated with the character code that has been acquired by the optical character recognition, an italic determination step of determining whether or not the character in the image data is italic using the italic determination method that has been selected by the determination method selection step, and a font specifying step of specifying a font of the character by checking the character that has been determined to be italic by the italic determination step only with the italic font included in the font dictionary data and checking the character that has been determined to be non-italic by the italic determination step only with the non-italic font included in the font dictionary data.

Also, a recording medium according to the present disclosure is a non-transitory computer-readable recording medium which is able to record a program that is executable by a computer. The program is a program that causes a computer to realize a determination method selection function of selecting, from a plurality of italic determination methods that are used for italic determination for the character, the italic determination method that is associated with the character code that has been acquired by the optical character recognition, an italic determination function of determining whether or not the character in the image data is italic using the italic determination method that has been selected by the determination method selection function, and a font specifying function of specifying a font of the character by checking the character that has been determined to be italic by the italic determination function only with the italic font included in the font dictionary data and checking the character that has been determined to be non-italic by the italic determination function only with the non-italic font included in the font dictionary data.

Needless to say, the present disclosure is not limited to the above-described embodiment and various modifications and changes may be made to the embodiment without departing from the gist of the present disclosure.

What is claimed is:

1. A character recognition device which recognizes a character in image data by optical character recognition and acquires a character code, the character recognition device comprising:
    a font dictionary data configured to include an italic font and a non-italic font for each character code;
    a determination method selection unit that selects, from a plurality of italic determination methods that are used for italic determination for the character, the italic determination method that is associated with the character code that has been acquired by the optical character recognition;
    an italic determination unit that determines whether or not the character in the image data is italic using the italic determination method that has been selected by the determination method selection unit; and
    a font specifying unit that specifies a font of the character by checking the character that has been determined to be italic by the italic determination unit only with the italic font included in the font dictionary data and checking the character that has been determined to be non-italic by the italic determination unit only with the non-italic font included in the font dictionary data,
    wherein the plurality of italic determination methods is straight-line detection by Hough conversion, gravity center comparison, and straight-line detection by a least-square method.

2. The character recognition device according to claim 1, wherein the italic determination unit performs straight-line detection for the character by the Hough conversion, determines, if a straight line in a longitudinal direction of the character has been detected, that the character is non-italic, and determines, if a straight line in a direction other than the longitudinal direction of the character has been detected, that the character is italic.

3. The character recognition device according to claim 1, wherein the italic determination unit calculates each of an upper end part side gravity center position and a lower end part side gravity center position of the character, determines, if a distance between the upper end part side gravity center position and the lower end part side gravity center position relative to a lateral direction of the character is in a specific distance range, that the character is non-italic, and determines, if the distance is outside the specific distance range, that the character is italic.

4. The character recognition device according to claim 1, wherein the italic determination unit detects a straight line with which a distance in a longitudinal direction of the character is shortest by the least-square method, determines, if a straight line in a lateral direction of the character has been detected, that the character is non-italic, and determines, if a straight line in a direction other than the lateral direction of the character has been detected, that the character is italic.

5. The character recognition device according to claim 1, wherein each of character codes that indicate 1, 4, B, D to F, H to N, P, R, T, Y, b, d, f, h to n, p to r, t, and u is associated with the straight-line detection by Hough conversion.

6. The character recognition device according to claim 1, wherein each of character codes that indicate 0, 2, 3, 7, 8, A, C, G, O, S, U to X, Z, a, c, e, g, o, s, and v to z is associated with the gravity center comparison.

7. The character recognition device according to claim 1, wherein each of character codes that indicate 5, 6, 9, and Q is associated with the straight-line detection by a least-square method.

8. The character recognition device according to claim 1, wherein the determination method selection unit selects multiple ones of the italic determination methods for a specific one of the character codes, the italic determination unit determines whether or not the character in the image data is italic using each of the multiple ones of the italic determination methods which have been selected by the determination method selection unit, and the font specific unit specifies a font of the character by exceptionally checking, if results of determinations performed by the italic determination unit using the multiple ones of the italic determination methods are not the same, the character with the font dictionary data including the italic font and the non-italic font.

9. The character recognition device according to claim 8, wherein the determination method selection unit selects multiple ones of the italic determination methods only if the font that has been specified by the font specifying unit is a font of a specific type.

10. A character recognition method of a character recognition device that recognizes a character in image data by optical character recognition and acquires a character code, the character recognition device including a font dictionary data configured to include an italic font and a non-italic font for each character code, the character recognition method comprising:

selecting, from a plurality of italic determination methods that are used for italic determination for the character, the italic determination method that is associated with the character code that has been acquired by the optical character recognition;

determining whether or not the character in the image data is italic using the italic determination method that has been selected by the determination method selection step; and specifying a font of the character by checking the character that has been determined to be italic by the italic determination step only with the italic font included in the font dictionary data and checking the character that has been determined to be non-italic by the italic determination step only with the non-italic font included in the font dictionary data, wherein the plurality of italic determination methods is straight-line detection by Hough conversion, gravity center comparison, and straight-line detection by a least-square method.

11. One or more non-transitory computer-readable media including instructions which, when executed by one or more processors of a character recognition device, cause the character recognition device to perform a character recognition method of:

selecting, from a plurality of italic determination methods that are used for italic determination for the character, the italic determination method that is associated with the character code that has been acquired by the optical character recognition, determining whether or not the character in the image data is italic using the italic determination method that has been selected by the determination method selection function, and specifying a font of the character by checking the character that has been determined to be italic by the italic determination function only with an italic font included in font dictionary data that is configured to include the italic font and a non-italic font and checking the character that has been determined to be non-italic by the italic determination function only with the non-italic font included in the font dictionary data, wherein the plurality of italic determination methods is straight-line detection by Hough conversion, gravity center comparison, and straight-line detection by a least-square method.

* * * * *